Oct. 13, 1936.  J. A. ANDREW  2,057,550
COFFEE URN
Filed Feb. 28, 1934
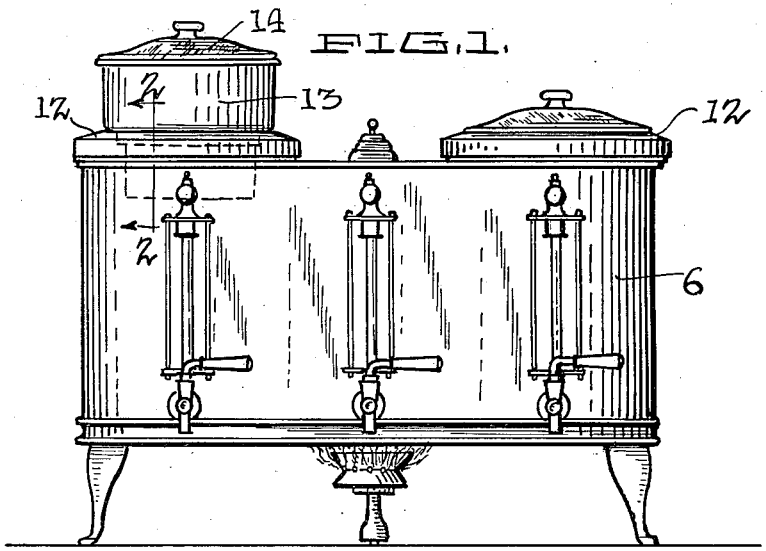
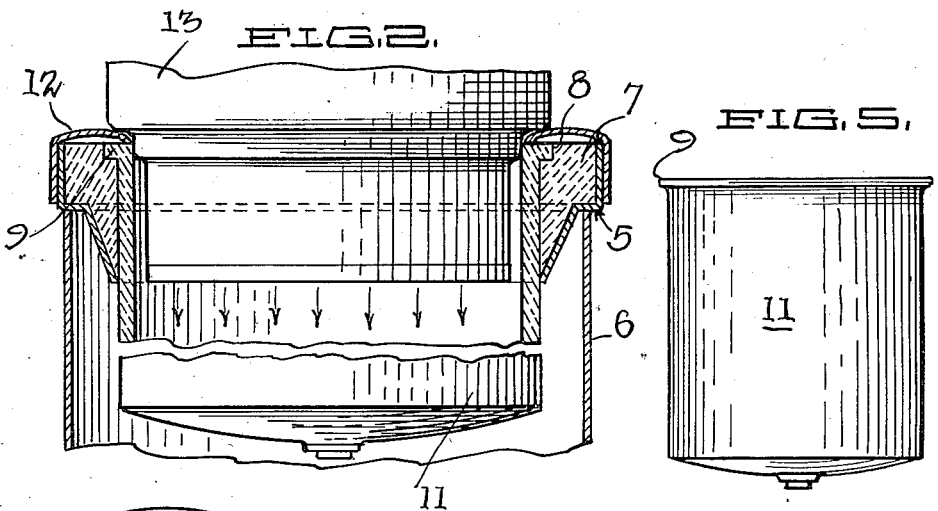
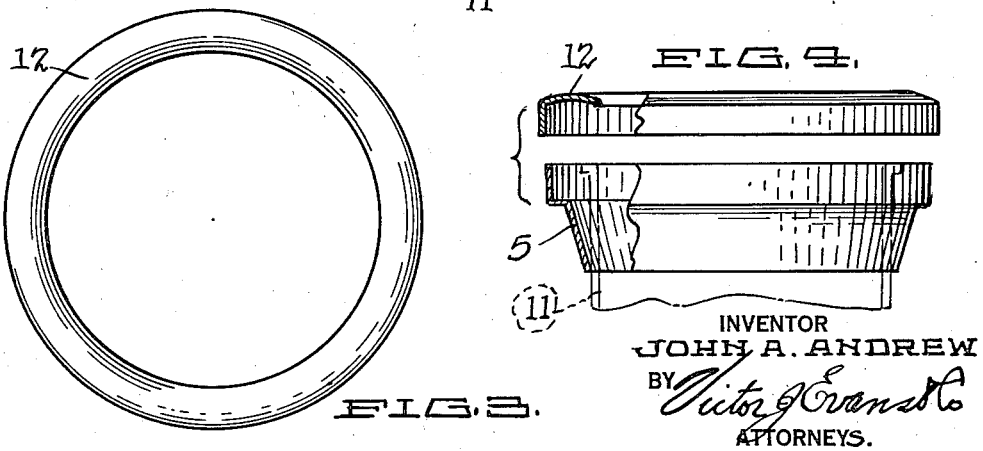
INVENTOR
JOHN A. ANDREW
BY
ATTORNEYS.

Patented Oct. 13, 1936

2,057,550

UNITED STATES PATENT OFFICE 2,057,550

COFFEE URN

John A. Andrew, San Francisco, Calif.

Application February 28, 1934, Serial No. 713,372

2 Claims. (Cl. 53—3)

This invention relates to new and useful improvements in coffee urns and has particular reference to the percolating units of said urns.

Restaurant coffee urns of the usual type consist of single, double and triple percolating elements and in all types of coffee urns, a hinged metallic or loose cover is provided for each percolating element and encloses the percolator while the coffee is being percolated or while it is being kept hot for future consumption.

In all coffee urns of this character it has been found that the condensates from the percolating coffee in the urn collect on the cover thereof and drop back into the crock of each percolating unit, thus contaminating the coffee in that particular percolating unit. For it is obvious that the continual dripping of condensed steam is apt to make the coffee bitter and furthermore the employment of a metal cover also imparts to the coffee a metallic taste, because of disintegration of the lid and a consequent admixture of the particles of the metallic lid with the percolated coffee. Furthermore in the referred to types, steam and acid contacting the metallic parts of the urn make the same dirty, wash the accumulated dirt into the coffee and impart to the coffee the said metallic taste. It is, therefore, the object of my invention to obviate these disadvantages by the use of a detachable glass cover and by the substitution of a universal percolating unit that may be inserted in any type of restaurant coffee urn, thus preventing the contamination of the coffee by the return of the condensates from the cover or hinged cap of the urn. In my particular type extreme sanitation is realized, because the steam does not contact the metallic ring.

A further object of the invention is the provision of an improved percolating unit that is of universal character and that may be adapted to any standard type of commercial coffee urn, and to embody in said unit a detachable inexpensive ring that can be readily replaced.

An additional object is that of providing percolating units of the class described that are simple in construction and design and that may be readily substituted for the present percolator unit utilized in the ordinary type of restaurant or hotel coffee urn.

A further object of the invention is the provision of a unit that is economical to manufacture, simple in construction and efficient in use.

Other objects and advantages will be apparent during the course of the following description.

In the accompanying drawing forming a part of this specification and in which like numerals are employed to designate like parts throughout the same, Fig. 1 is a front elevation of an ordinary coffee urn of the multiple unit type, Fig. 2 is a fragmentary enlarged detail view partly in cross section and taken on the line 2—2 of Fig. 1, Fig. 3 is a top plan view of the detachable ring, Fig. 4 is a side elevation of a detachable ring and the crock supporting ring in separated relation and partly in cross section, and Fig. 5 is a side elevation of the crock.

In the accompanying drawing wherein for the purpose of illustration is shown a preferred embodiment of my invention, the numeral 5 designates a crock supporting ring adapted to rest upon the shell 6 of the coffee making unit and including a conical shaped member fitting snugly around the upper end of the crock. Within this ring there is poured a ring 7 which is preferably made of cement and has an annular recess 8 adapted to receive a lip 9, formed upon the crock 11. Thus the crock is supported in the unit and spaced from the walls thereof by the molded ring 7. At 12 I have shown a detachable ring which overlies the molded ring 7 and has its inner periphery resting upon the upper edge of the crock while its outer periphery overlaps and frictionally engages the ring 5. This ring 12 supports the coffee holder 13 which is of ordinary construction. In said holder the coffee is placed and water poured thereover, which water will subsequently drip into the crock 11. The detachable glass cover is indicated by the numeral 14.

In employing my device the parts are assembled as shown in Fig. 2. The burner is then lit beneath the unit, and after the water in the center portion of the unit has become hot, this water is withdrawn and poured into the coffee holder 13 and allowed to drip therethrough. When the water has entirely dripped from the holder the holder may be removed and the cover 14 moved down to rest upon the ring 12. The coffee holder may then be placed in another crock and the operation repeated.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a coffee urn of the class described, in combination, a removable unit arranged in said urn and consisting of a lipped crock, a supporting ring for said crock having a shouldered section resting upon the upper end of the urn and embodying a conical extension engaging the side of the crock and cemented thereto, a second flanged ring encompassing said supporting ring and snugly fitting thereabout, and a shouldered coffee holding receptacle resting upon said last ring and extending into said crock.

2. In a coffee urn of the class described, in combination, a removable unit arranged in said urn and embodying a lipped crock and a coffee holding receptacle, a supporting ring for said unit comprising a flanged ring of greater diameter than that of said crock and having a shoulder resting upon said urn and embodying a conical extension engaging the side wall of the crock, cementitious material in said ring embedding the lip of the crock therein, a second flanged ring encompassing said first mentioned ring and having a curved supporting surface, and said coffee holding receptacle having a shoulder adapted to rest upon said second ring and extending into said crock.

JOHN A. ANDREW.